United States Patent
Abdo et al.

(10) Patent No.: US 8,189,661 B2
(45) Date of Patent: May 29, 2012

(54) REMOTE DESKTOP PROTOCOL (RDP) TILE IMAGE CLASSIFICATION FOR IMPROVING COMPRESSION EFFICIENCY AND QUALITY

(75) Inventors: Nadim Y. Abdo, Redmond, WA (US); Graham Edward Fagg, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 714 days.

(21) Appl. No.: 12/400,654

(22) Filed: Mar. 9, 2009

(65) Prior Publication Data

US 2010/0226548 A1 Sep. 9, 2010

(51) Int. Cl.
*H04N 7/12* (2006.01)
(52) U.S. Cl. .................. 375/240.02; 382/239
(58) Field of Classification Search .............. 375/240.02
See application file for complete search history.

(56) References Cited

U.S. PATENT DOCUMENTS

| | | | |
|---|---|---|---|
| 5,933,194 A * | 8/1999 | Kim et al. ................ 348/403.1 |
| 5,970,233 A | 10/1999 | Liu | |
| 6,272,178 B1 * | 8/2001 | Nieweglowski et al. | 375/240.03 |
| 6,563,955 B2 * | 5/2003 | de Queiroz ................ 382/239 |
| 6,618,509 B2 * | 9/2003 | Wu et al. .................... 382/239 |
| 6,760,481 B1 * | 7/2004 | Chebil et al. ............... 382/240 |
| 6,895,051 B2 * | 5/2005 | Nieweglowski et al. | 375/240.03 |
| 6,975,742 B2 * | 12/2005 | Cheng ........................ 382/243 |
| 7,024,045 B2 | 4/2006 | McIntyre | |
| 7,079,695 B2 * | 7/2006 | Wu et al. .................... 382/239 |
| 7,171,444 B2 | 1/2007 | Deshpande | |
| 7,460,038 B2 | 12/2008 | Samuels | |
| 7,835,596 B2 * | 11/2010 | Hornback et al. ........... 382/303 |
| 2002/0044604 A1 * | 4/2002 | Nieweglowski et al. | 375/240.03 |
| 2002/0064313 A1 * | 5/2002 | Cheng ........................ 382/239 |
| 2003/0156649 A1 | 8/2003 | Abrams | |
| 2005/0053355 A1 * | 3/2005 | Kashino et al. ............... 386/46 |
| 2006/0072831 A1 | 4/2006 | Pallister | |
| 2007/0211141 A1 | 9/2007 | Christiansen | |
| 2008/0159640 A1 * | 7/2008 | Liu et al. .................... 382/239 |
| 2008/0205389 A1 | 8/2008 | Fang | |
| 2008/0244081 A1 | 10/2008 | Elangovan | |
| 2010/0226548 A1 * | 9/2010 | Abdo et al. .................. 382/128 |

OTHER PUBLICATIONS

Rauschenbach et al., "Adaptive Image Transmission," University of Rostock, Computer Science Department, D-18051 Germany, http://74.125.77.132/search?q=cache:VNnLuJFYclwJ:wscg.zcu.cz/wscg97/papers97/Rausch_97.ps.gz+Dynamic+bandwith+adaptive+image+compression/decompression&hl=en&ct=clnk&cd=7&gl=uk, Dec. 30, 2008, p. 1-13.

(Continued)

*Primary Examiner* — Sath V Perungavoor
(74) *Attorney, Agent, or Firm* — Woodcock Washburn LLP

(57) ABSTRACT

Systems, methods and computer readable media are disclosed for improving compression efficiency and quality in a remote session via tile image classification and variable encoding. A server determines a set of codecs that are shared by both the server and a corresponding client. Then, when it receives an image, it determines whether classification of the image is required. Where classification of the image is not required, the server sends the client the image, either uncompressed or compressed with a default codec and default fidelity. Where classification of the image is required, the server classifies the image (e.g. the image comprises either text or photograph), and based on that classification determines a codec with which to encode the image, and a fidelity to use on the encoding. The server performs that encoding with the codec and the fidelity, and then sends this encoded image to the client.

16 Claims, 4 Drawing Sheets

OTHER PUBLICATIONS

Pinzari, G.F., "NX X Protocol Compression," Nomachine, http://www.nomachine.com/documents/html/NX-XProtocolCompression.html#7, Sep. 26, 2003, p. 1-7.

Paul et al., "Chromium Renderserver: Scalable and Open Remote Rendering Infrastructure," IEEE, http://74.125.77.132/search?q=cache:A8FaNRErjikJ:www-vis.lbl.gov/Publications/2008/LBNL-63693-CRRS.pdf+run+time+OR+dynamic+%22image+encoding%22+RDP+compression&hl=en&ct=clnk&cd=15&gl=in, Dec. 30, 2008, p. 1-24.

* cited by examiner

REMOTE DESKTOP PROTOCOL (RDP) TILE IMAGE CLASSIFICATION FOR IMPROVING COMPRESSION EFFICIENCY AND QUALITY

BACKGROUND OF THE INVENTION

Although computers were once isolated and had minimal or little interaction with other computers, today's computers interact with a wide variety of other computers through communications networks, such as Local Area Networks (LANs) and Wide Area Networks (WANs). With the wide-spread growth of the INTERNET™, connectivity between computers is becoming more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as virtual computing systems, which can use protocols such as Remote Desktop Protocol (RDP), Independent Computing Architecture (ICA), and others to share a desktop and other applications with a remote client over a remote session. Such computing systems typically transmit the keyboard presses and mouse clicks or selections from the client to a server, relaying the screen updates back in the other direction over a network connection (e.g., the INTERNET). As such, the user has the experience as if their machine is operating as part of a LAN, when in reality the client device is only sent screenshots of the applications as they appear on the server side.

To reduce the often limited network bandwidth required for a session, the server may compress an image (frequently, the unit of images is a tile, which comprises a subset of a frame) before sending the image across the network, and the client then performs the corresponding decompression operation after receiving the image. These images are generated on the server as the remote session progresses, so the compression must occur at runtime. Additionally, since the latency of a session is a major factor in the user experience, such compression and decompression must be performed quickly relative to the time savings of sending a smaller compressed image as opposed to a larger uncompressed image. Given these requirements, present runtime classification systems primarily use very constrained criteria to decide on how to encode image data, such as those based on basic content type and/or those that take a running average of network capacity. Both of these techniques may be used for a single type of image, such as text, or high-resolution video. These systems have only a single codec in use at any one time, and the time required to switch codecs takes so long that it negatively impacts the responsiveness of the RDP session.

SUMMARY OF THE INVENTION

It would therefore be an improvement to implement a more generic, modular system that allows multiple factors to be included in a compression decision, the decision including not only the quality setting to use for any particular codec, but also choosing between multiple codecs simultaneously based on the particulars of the remote client. It would additionally be an improvement to institute a hybrid approach where tiles are classified through a preliminary step that determines the preferred type of compressor for the content by taking into account considerations such as the image content (e.g. high-detail text or video), network conditions (e.g. the desired bandwidth used), and CPU load.

In an exemplary embodiment, a server determines a set of codecs that are shared by both the server and a client with which it is conducting a remote session. Then, when it receives an image, it determines whether classification of the image is required. Where classification of the image is not required, the server sends the client the image, either uncompressed or compressed with a default codec and default fidelity. Where classification of the image is required, the server classifies the image (e.g. the image comprises either text or photograph), and based on that classification determines a codec with which to encode the image, and a fidelity to use on the encoding. The server performs that encoding with the codec and the fidelity, and then sends this encoded image to the client.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media in accordance with this specification are further described with reference to the accompanying drawings in which.

DETAILED DESCRIPTION OF ILLUSTRATIVE EMBODIMENTS

Figure 1:
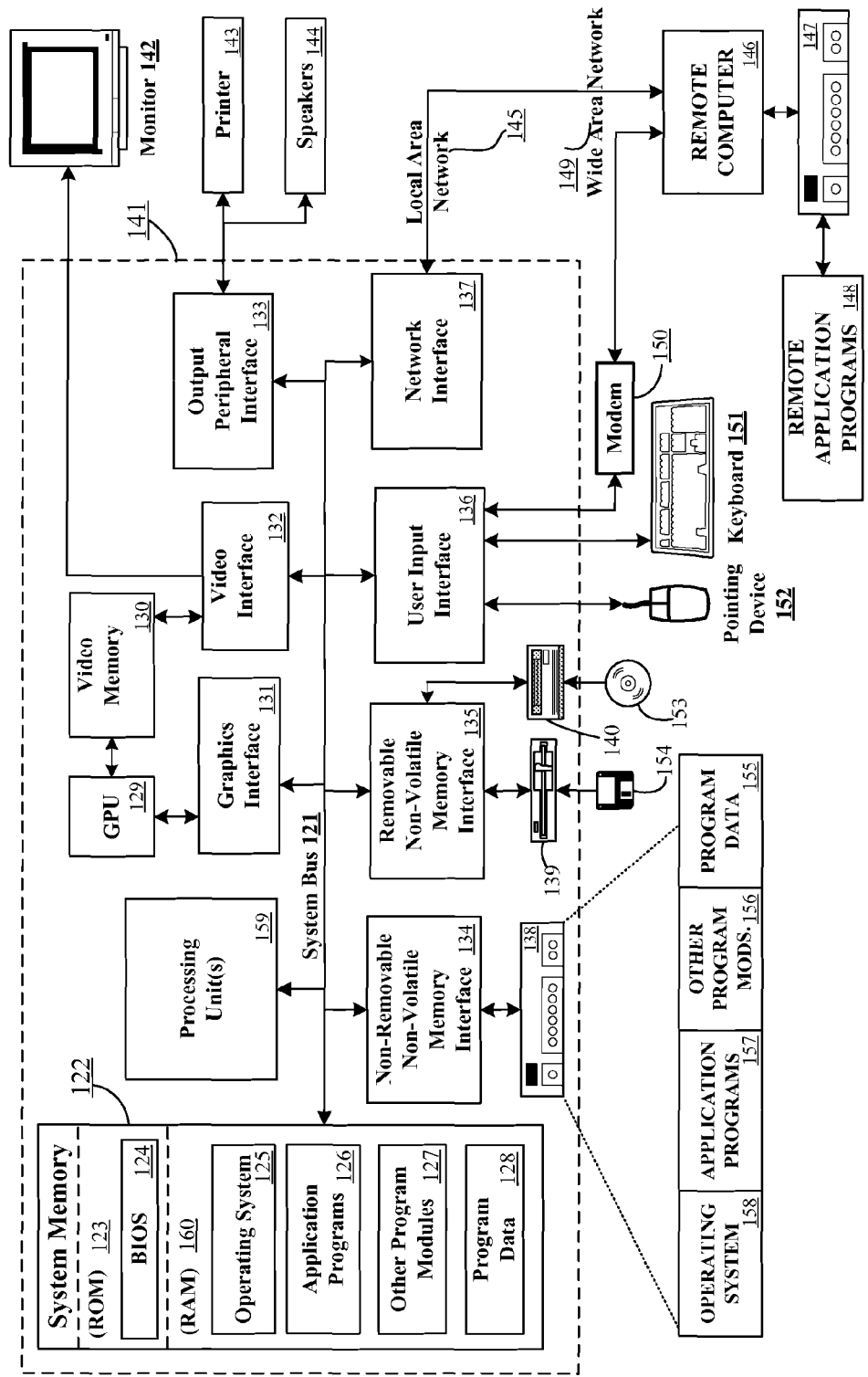
FIG. 1 illustrates an exemplary general purpose computing environment in which in which the techniques described herein may be embodied.

FIG. 1 is a block diagram of a general purpose computing device in which the techniques described herein may be employed. The computing system environment 120 is only one example of a suitable computing environment and is not intended to suggest any limitation as to the scope of use or functionality of the presently disclosed subject matter. Neither should the computing environment 120 be interpreted as having any dependency or requirement relating to any one or combination of components illustrated in the exemplary operating environment 120. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer readable media. Computer readable media can be any available media that can be accessed by computer 141 and includes both volatile and nonvolatile media, removable and non-removable media. The system memory 122 includes computer storage media in the form of volatile and/or nonvolatile memory such as read only memory (ROM) 123 and random access memory (RAM) 160. A basic input/output system 124 (BIOS), containing the basic routines that help to transfer information between elements within computer 141, such as during start-up, is typically stored in ROM 123. RAM 160 typically contains data and/or program modules that are immediately accessible to and/or presently being operated on by processing unit 159. By way of example, and not limitation, FIG. 1 illustrates operating system 125, application programs 126, other program modules 127, and program data 128.

The computer 141 may also include other removable/non-removable, volatile/nonvolatile computer storage media. By way of example only, FIG. 1 illustrates a hard disk drive 138 that reads from or writes to non-removable, nonvolatile magnetic media, a magnetic disk drive 139 that reads from or writes to a removable, nonvolatile magnetic disk 154, and an optical disk drive 140 that reads from or writes to a removable, nonvolatile optical disk 153 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 138 is typically connected to the system bus 121 through an non-removable memory interface such as interface 134, and magnetic disk drive 139 and optical disk drive 140 are typically connected to the system bus 121 by a removable memory interface, such as interface 135.

The drives and their associated computer storage media discussed above and illustrated in FIG. 1, provide storage of computer readable instructions, data structures, program modules and other data for the computer 141. In FIG. 1, for example, hard disk drive 138 is illustrated as storing operating system 158, application programs 157, other program modules 156, and program data 155. Note that these components can either be the same as or different from operating system 125, application programs 126, other program modules 127, and program data 128. Operating system 158, application programs 157, other program modules 156, and program data 155 are given different numbers here to illustrate that, at a minimum, they are different copies. A user may enter commands and information into the computer 141 through input devices such as a keyboard 151 and pointing device 152, commonly referred to as a mouse, trackball or touch pad. Other input devices (not shown) may include a microphone, joystick, game pad, satellite dish, scanner, or the like. These and other input devices are often connected to the processing unit 159 through a user input interface 136 that is coupled to the system bus, but may be connected by other interface and bus structures, such as a parallel port, game port or a universal serial bus (USB). A monitor 142 or other type of display device is also connected to the system bus 121 via an interface, such as a video interface 132. In addition to the monitor, computers may also include other peripheral output devices such as speakers 144 and printer 143, which may be connected through a output peripheral interface 133.

The computer 141 may operate in a networked environment using logical connections to one or more remote computers, such as a remote computer 146. The remote computer 146 may be a personal computer, a server, a router, a network PC, a peer device or other common network node, and typically includes many or all of the elements described above relative to the computer 141, although only a memory storage device 147 has been illustrated in FIG. 1. The logical connections depicted in FIG. 1 include a local area network (LAN) 145 and a wide area network (WAN) 149, but may also include other networks. Such networking environments are commonplace in offices, enterprise-wide computer networks, intranets and the Internet.

When used in a LAN networking environment, the computer 141 is connected to the LAN 145 through a network interface or adapter 137. When used in a WAN networking environment, the computer 141 typically includes a modem 150 or other means for establishing communications over the WAN 149, such as the Internet. The modem 150, which may be internal or external, may be connected to the system bus 121 via the user input interface 136, or other appropriate mechanism. In a networked environment, program modules depicted relative to the computer 141, or portions thereof, may be stored in the remote memory storage device. By way of example, and not limitation, FIG. 1 illustrates remote application programs 148 as residing on memory device 147. It will be appreciated that the network connections shown are exemplary and other means of establishing a communications link between the computers may be used.

Figure 2:
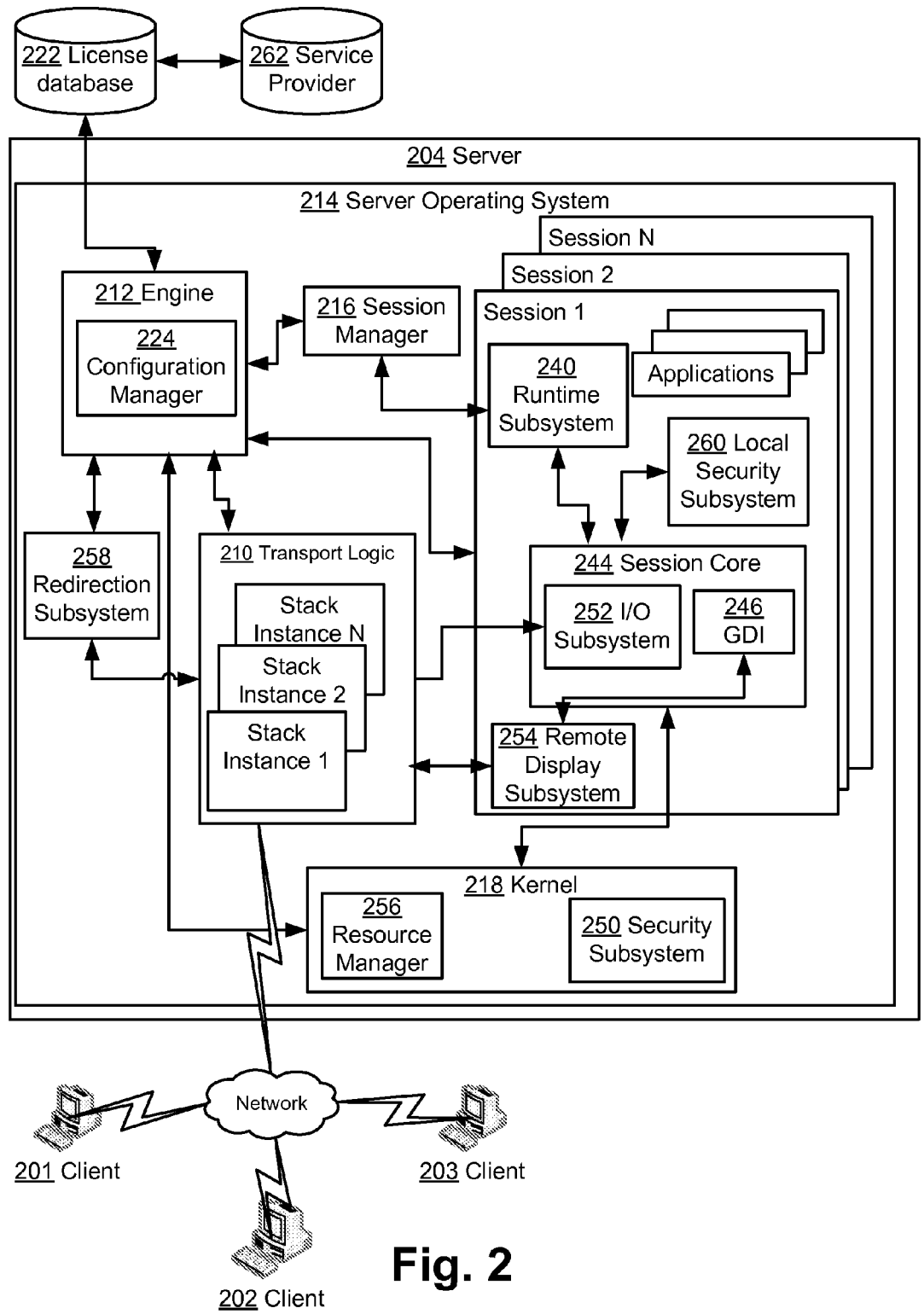
FIG. 2 depicts an operational environment for practicing aspects of the present disclosure.

Referring now to FIG. 2, it generally illustrates an example environment wherein aspects of the present disclosure can be implemented. One skilled in the art can appreciate that the example elements depicted by FIG. 2 provide an operational framework for describing the present disclosure. Accordingly, in some embodiments the physical layout of the environment may be different depending on different implementation schemes. Thus the example operational framework is to be treated as illustrative only and in no way limit the scope of the claims. One skilled in the art can also appreciate that the following discussion is introductory and the elements depicted by FIG. 2 are described in more detail within the discussion of the operational procedures of FIG. 3 through FIG. 8.

Generally, FIG. 2 depicts a high level overview of a terminal server environment that can be configured to include aspects of the present disclosure. In reference to the figure, a server 204 is depicted that can include circuitry configured to effectuate a terminal server and for example, three example clients 201, 202, and 203 (while three clients are depicted the server 204 in embodiments can service more or less clients). The example clients 201-203 can include computer terminals effectuated by hardware configured to direct user input to the server 204 and display user interface information generated by the server 204. In other embodiments, clients 201-203 can be computers that include similar elements as those of computer 20 FIG. 1. In these example embodiments, clients 201-203 can include circuitry configured to effect operating systems and circuitry configured to emulate the functionality of terminals. In these examples one skilled in the art can appreciate that the circuitry configured to effectuate the operating systems can also include the circuitry configured to emulate terminals.

In the depicted example, the server 204 can be configured to generate one or more sessions for connecting clients 201, 202, and 203 such as sessions 1 through N (where N is an integer greater than 1). Briefly, a session in example embodiments of the present disclosure can generally include an operational environment that is effectuated by a plurality of subsystems, e.g., software code, that are configured to effectuate an execution environment and interact with a kernel 218 an operating system 214. For example, a session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. The session in this example can include similar subsystems as the session described above. Generally, a session can be generated by the server 204 on a user by user basis when, for example, the server 204 receives a connection request over a network connection from a client such as client 201. Generally, a connection request can first be handled by the transport logic 210 that can, for example, be effectuated by circuitry of the server 204. The transport logic 210 can in some embodiments include a network adaptor, firmware, and software that can be configured to listen for connection messages and forward them to the engine 212. As illustrated by FIG. 2, when sessions are generated the transport logic 210 can include protocol stack instances for each session. Generally, each protocol stack instance can be configured to route user interface output to an associated client and route user input received from the associated client to the appropriate session core 244.

As depicted by FIG. 2, during the session generation process the engine 212 can be configured to obtain a license for the session. For example, in one example embodiment the engine 212 can receive a license from the client 201 during the session generation process. In other example embodiments the engine 212 can receive a copy of a license from a license database 222. In some embodiments of the present disclosure the license database 222 can include a relational database management program that can be executed on an operating system of a computer such as computer 20 of FIG. 1. In an example embodiment that includes a license database 222, it can store one or more licenses that can be checked out when a client attempts to obtain a session from the server 204. In another embodiment each license can itself be associated with an account identifier, e.g., a username/password combination, a smartcard identifier, etc., and each license can only be checked out if the correct account identifier is presented. Generally, the number of connections that a server 204 can generate can be dependent upon the number of licensees the entity that controls the server 204 has purchased from a service provider. If for example, the entity has purchased one license, then the server 204 can be configured to only allow one session. In this example if the license is associated with an account identifier, then only a user that presents the correct account identifier can obtain a session.

In example embodiments of the present disclosure each license can be validated by a service provider 262 before they can be used. For example, the service provider 262 can in example embodiments act as a certificate authority that aphorizes and activates licenses and servers. In these embodiments the service provider 262 can ensure that licenses are not stolen, copied, or pirated. The service provider 262 can also ensure that the license are only used by the server 204 they are purchased for by storing a copy of the licenses in a database and associating the licenses with server 204.

As illustrated by FIG. 2, a configuration manager 224 in an example embodiment of the present disclosure can include computer readable instructions that when executed instantiate a process that can receive a license during the session creation process and determine a service level for a newly spawned session by interfacing with various subsystems such as session manager 216. The session manager 216 in an embodiment can be configured to initialize and manage each session by for example, generating a session identifier for a session space; adding the session identifier to a table; assigning memory to the session space; and generating system environment variables and instances of subsystem processes in memory assigned to the session space. As illustrated by FIG. 2, in an embodiment the session manager 216 can instantiate environment subsystems such as a runtime subsystem 240 that can include a kernel mode part such as the session core 244. For example, the environment subsystems in an embodiment can be configured to expose a subset of services to application programs and provide an access point to the kernel 218 of the operating system 214. As illustrated by FIG. 2, in some embodiments the kernel 218 can include a security subsystem 250 and a resource manager 256. In an example embodiment the security subsystem 250 can enforce security policies of the server 204 by, for example, performing runtime object protection. In these embodiments the resource manager 256 in an embodiment can create and terminate processes and threads in response to requests from the runtime subsystem 240. More specifically, in an embodiment the runtime subsystem 240 can request the execution of threads and the session core 244 can send requests to the executive of the kernel 218 to allocate memory for the threads and schedule time for them to be executed.

Continuing with the description of FIG. 2, in an embodiment the session core 244 can include a graphics display interface 246 (GDI) and an input subsystem 252. The input subsystem 252 in an example embodiment can be configured to receive user input from a client 201 via the protocol stack instance associated with the session and transmit the input to the session core 244. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and processed by the GDI 246. The GDI 246 in general can include a process that can generate graphical object draw commands. The GDI 246 in this example embodiment can be configured to pass the commands to the remote display subsystem 254 that can instantiate a display driver for the session. In an example embodiment the remote display subsystem 254 can be configured to include virtual display driver(s) that may not be associated with displays physically attacked to the server 204, e.g., the server 204 could be running headless. The virtual display driver in this embodiment can be configured to receive the draw commands and transmit them to the client 201 via a stack instance associated with the session.

Figure 3:
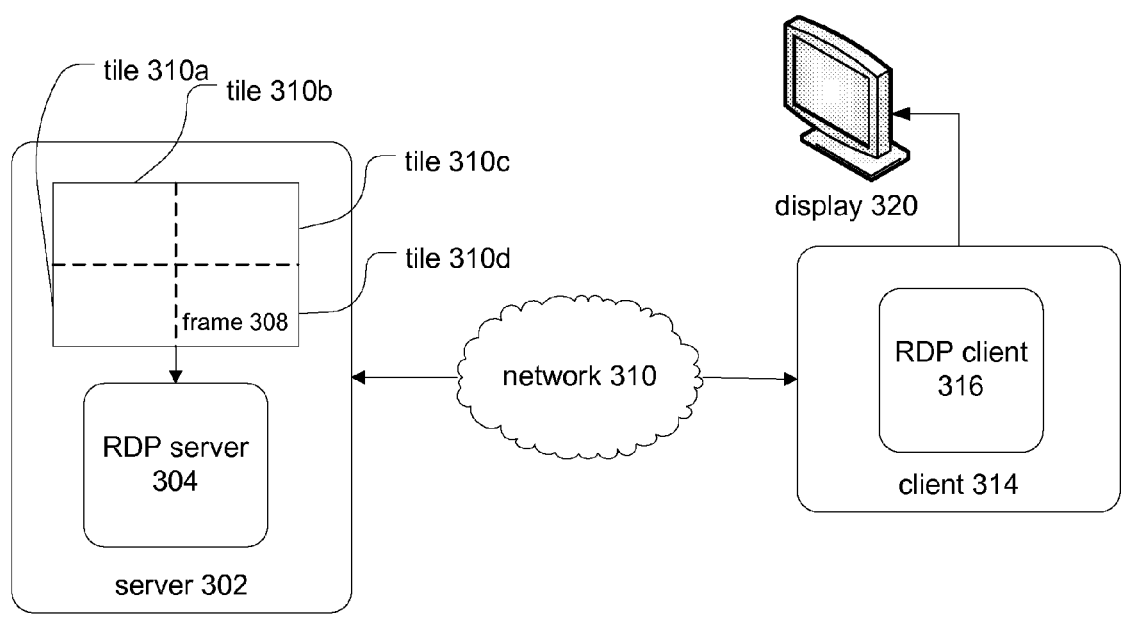
FIG. 3 illustrates a client and server communicating via a remote session that utilize variable compression based on image classification.

FIG. 3 illustrates An embodiment of a client 314 and server 302 communicating via a remote session that utilize variable compression based on image classification.

The server 302 and the client 314 maintain a remote session over a network 310. The RDP client 316 on the client computing device 314 issues commands to the RDP server 304 on the server computing device 302, which the server 302 executes to produce results and sends those results to the client 314 for display on display device 320. As the session proceeds, the server 302 sends the client 314 a plurality of image frame 308s. The server 302 divides each image frame 308 into a plurality of tiles 310.

For each tile 310 of each frame 308, the RDP server 304 determines whether compression is to be used, if so, compresses the tile 310.

The first stage of this process comprises a pre-filter that determines if any classification of any kind is required. This decision takes into account the capabilities of both the server 302 and client 314 or clients, the shared codecs available between parties to the remote session, the type of network 310 connection in use and requirements of the particular scenario for which the remote session is being used (e.g. a medical application). For example, on a very high speed connection or when handling medical images, only currently supported lossless codecs would be utilized. The image classification stage that follows has the potential to require a great deal of computing resources, and the use of those resources can be avoided where it is determined at this point that classification is not required.

Different available codecs have different abilities. For instance, one codec may greatly compress an image and preserve image quality for monochromatic text on a monochromatic background, but greatly reduce image quality for a photograph. A codec that preserves photographic image quality may not be able to compress that text as well as the first technique.

The second stage comprises image classification. If some level of bandwidth reduction is required, then the image to be encoded is then classified into a number of subtypes such as text on a monochromatic background, text on gradient backgrounds, simple image segments and dense image segments. The classification system is based on a histogram analysis of the image and may, depending on its content, recursively analysis the image (i.e. the cost of analyzing any particular image is not constant but based on contents).

The third stage comprises fidelity control. This is where a weighted decision function combines the networking characteristics, CPU loading, image characteristics, and codec capabilities to decide which codec and which fidelity options to use. For example if bandwidth is low, CPU availability is high and the image comprises dense graphics, then a lossy codec can be chosen with a lower quality setting, such as sub-sampling. Alternatively if the image comprises high quality text, and bandwidth is available, then a non-lossy codec can be chosen.

The fourth stage comprises codec invocation. The codec is invoked to encode the bitmap image data. If this stage fails, for example, due to lack of available resources to encode the image in a short enough time, then the fidelity control can be used to choose a different codec and/or fidelity.

Where the image has been processed as described above, it is then sent by the RDP server 304 to the RDP client 316 of the client 314 across the communications network 310. The client 314 receives the image, decodes it with the corresponding codec, and displays it on the client display device 320.

Figure 4:
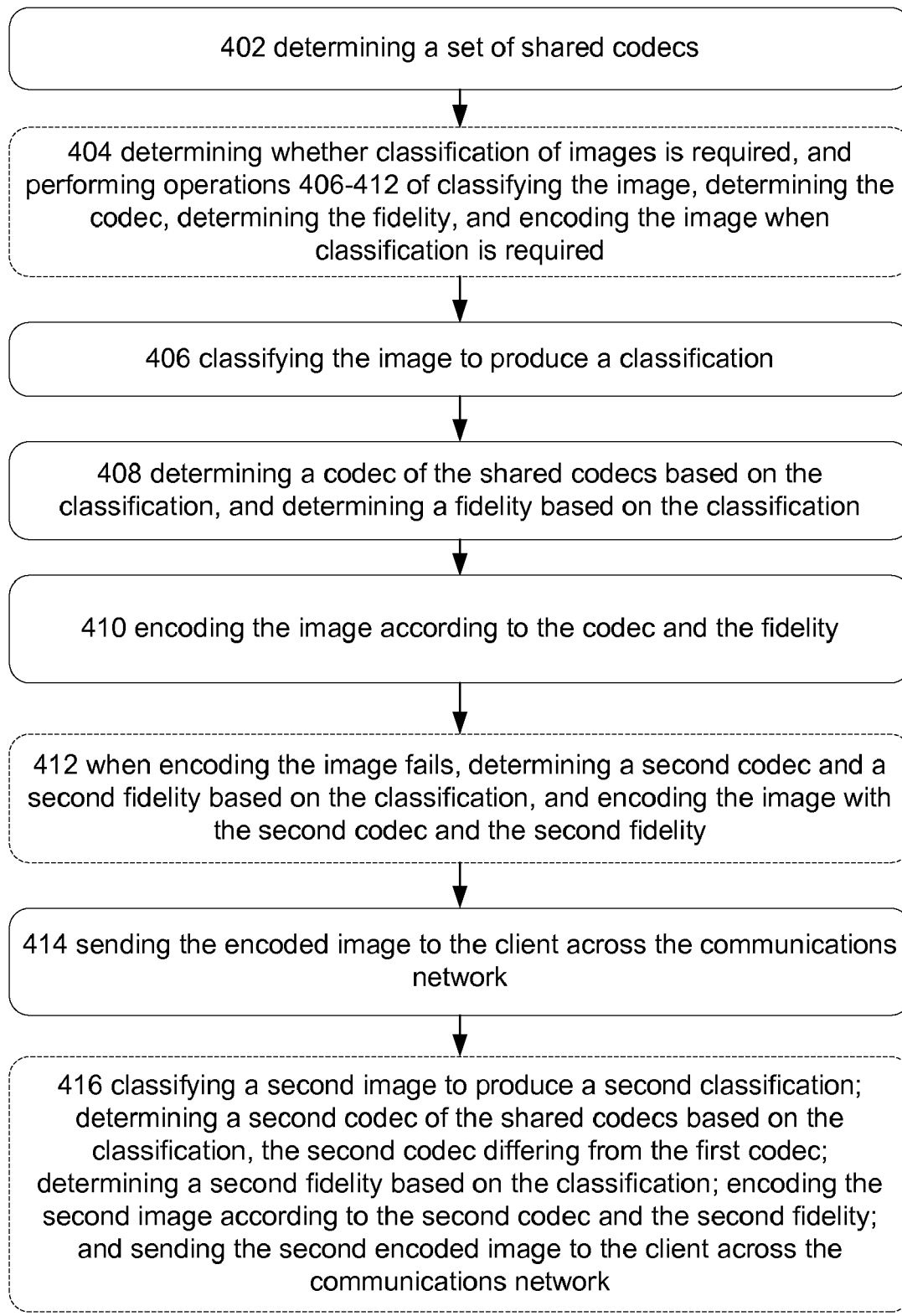
FIG. 4 illustrates exemplary operational procedures for variable compression based on image classification in a remote session.

FIG. 4 illustrates exemplary operational procedures for variable compression of an image for remote display from a server 302 to a client 314 during a session across a communications network 310.

Operation 402 depicts determining a set of shared codecs. In an embodiment, the set of shared codecs comprises each codec that is in both a set of server codecs and a set of client codecs. In an embodiment, the set of server codecs comprises those image formats that the server may encode an image to. In an embodiment, the set of client codecs comprises those image formats that the client may decode an image from. In an embodiment, the client sends the server a the set of client codecs when the remote session is initialized. In an embodiment, the client sends the server an updated list, either a partial one that notes only additions and/or deletions or a full list, when its decoding capabilities have changed during the session.

Optional operation 404 depicts determining whether classification of images is required, and performing operations 406-412 of classifying the image, determining the codec, determining the fidelity, and encoding the image when classification is required. In an embodiment, determining whether classification of images is required based on at least one capability of the server, at least one capability of the client, the set of shared codecs, a scenario of the session, and/or a connection across the communications network. For example, it may be determined that classifying the image is not required where the set of shared codecs comprises only one codec, so that is the only codec that may be used. It may also be determined that classifying the image is not required where the amount of available bandwidth is great enough that uncompressed images may be sent across the network.

Operation 406 depicts classifying the image to produce a classification. In an embodiment, this comprises classifying the image using a histogram of component frequencies of the image. In an embodiment, this comprises recursively classifying the image to produce the classification. In an embodiment, this comprises classifying the image as text on a monochromatic background, text on a gradient background, a simple image segment (e.g. a line drawing), or a dense image segment (e.g. a photograph).

In an embodiment, classifying the image comprises performing the classification based on a hint. The hint may comprise an application programming interface (API) call from an application that generated the image, a manifest for the application that generated the image, or an administrator policy. Where the application is aware that a remote session exists, it may make an API call that is detected by the server to indicate what the image is. For instance, the API call may indicate that the corresponding image comprises text on a gradient background, so the image does not need to use computing resources to generate a histogram to make the classification.

Operation 408 depicts determining a codec of the shared codecs based on the classification, and determining a fidelity based on the classification. In an embodiment, the remote session comprises a scenario, and determining the codec and determining the fidelity includes determining the codec based on the scenario, and determining the fidelity based on the scenario. In an embodiment, the scenario comprises a medical scenario where all photographs (likely to be x-rays or other images for which detail is paramount) must be sent in a lossless format.

In an embodiment, determining the codec and/or the fidelity is done so based on a hint. The hint may comprise an application programming interface (API) call from an application that generated the image, a manifest for the application that generated the image, or an administrator policy. Where the application itself does not generate a hint, or where the application does, but it should be overridden, a server administrator policy may provide that hint. For example, in a hospital, it may be determined that enough x-rays are being transferred that all images should be treated as high quality where only lossless encoding is acceptable, and that may be set as the server administrator policy that the RDP server may access in determining how to encode the image.

In an embodiment, a set of codecs comprises metadata for each codec in the set of codecs, and determining the codec comprises determining the codec based on the metadata of the set of shared codecs. In an embodiment, metadata for a codec comprises whether the client can hardware-accelerate decoding the corresponding codec. Some codecs, such as Joint Photographic Experts Group (JPEG), have many different implementations that operate at different speeds. The metadata may comprise the implementation of the codec. The metadata may comprise how well the client can handle the codec in other ways. For instance, where decoding a codec requires significant memory resources and the client has little memory, the metadata may indicate that the client handles this codec poorly.

In an embodiment, determining the fidelity comprises determining the fidelity using a weighted decision function. In an embodiment, the weighted decision function is based on at least one of at least one network characteristic, a CPU load of the server, a CPU load of the client, at least one characteristic of the image, or at least one capability of the codec. For instance, where the network is fast and has ample bandwidth, it may be determined that there is no transfer benefit to a smaller image size that outweighs the loss of quality, so only lossless codecs will be used.

Operation 410 depicts encoding the image according to the codec and the fidelity.

Optional operation 412 depicts when encoding the image fails, determining a second codec and a second fidelity based on the classification, and encoding the image with the second codec and the second fidelity. Encoding the image could fail because insufficient computing resources were available with which to encode it during a prescribed time period. In this instance, a second codec and second fidelity could be selected such that this second encoding requires much less computing resources are required, so the image can be encoded more quickly.

Operation 414 depicts sending the encoded image to the client across the communications network. In an embodiment, this comprises sending the encoded image to the client according to a remote desktop protocol (RDP).

Optional operation 416 depicts classifying a second image to produce a second classification; determining a second codec of the shared codecs based on the classification, the second codec differing from the first codec; determining a second fidelity based on the classification; encoding the second image according to the second codec and the second fidelity; and sending the second encoded image to the client across the communications network. Multiple codecs may be used, and where two images are classified in different ways, such that it would be beneficial to the remote session that separate codecs are used to encode them (such as the maximum compression ratio for each image may only be achieved by using different codecs), then a second image may be separately classified and encoded with a second codec as compared to a first image.

Conclusion

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for variable compression of an image for remote display from a server to a client during a session across a communications network, comprising:
   determining a set of shared codecs;
   classifying the image using a histogram of component frequencies of the image to produce a classification, the classification comprising text, text on a gradient background, a simple image segment, or a dense image segment;
   determining a codec of the shared codecs based on the classification, and a hint, the hint comprising an application programming interface (API) call from an application that generated the image, a manifest for the application that generated the image, a policy, a schema, or an administrator policy;
   determining a fidelity based on the classification;
   encoding the image according to the codec and the fidelity; and
   sending the encoded image to the client across the communications network.

2. The method of claim 1, further comprising:
   classifying a second image to produce a second classification;
   determining a second codec of the shared codecs based on the classification, the second codec differing from the first codec;
   determining a second fidelity based on the classification;
   encoding the second image according to the second codec and the second fidelity; and
   sending the second encoded image to the client across the communications network.

3. The method of claim 1, wherein the session comprises a scenario, and determining the codec and determining the fidelity include:
   determining the codec based on the scenario; and
   determining the fidelity based on the scenario.

4. The method of claim 3, wherein the scenario comprises a medical scenario.

5. The method of claim 1, wherein a set of codecs comprises metadata for each codec in the set of codecs, and determining the codec comprises:
   determining the codec based on the metadata of the set of shared codecs.

6. The method of claim 1, wherein metadata comprises:
   an indication of whether the client can hardware-accelerate decoding the corresponding codec.

7. The method of claim 1, further comprising:
   classifying the image, determining the codec, determining the fidelity, and encoding the image in response to determining to classify images.

8. The method of claim 7, wherein determining whether classification of images is required comprises:
   determining to classify images based on a capability of the server, a capability of the client, the set of shared codecs, a scenario of the session, or a connection across the communications network.

9. The method of claim 1, further comprising:
   when encoding the image fails, determining a second codec and a second fidelity based on the classification; and
   encoding the image with the second codec and the second fidelity.

10. The method of claim 1, wherein the set of shared codecs comprises each codec that is in both a set of server codecs and a set of client codecs.

11. The method of claim 1, wherein classifying the image to produce the classification comprises:
   recursively classifying the image to produce the classification.

12. The method of claim 1, wherein determining the fidelity comprises:
   determining the fidelity using a weighted decision function.

13. The method of claim 12, wherein determining the fidelity using a weighted decision function comprises:
   determining the fidelity using a weighted decision function based on a network characteristic, a CPU load of the server, a CPU load of the client, a characteristic of the image, or a capability of the codec.

14. The method of claim 1, wherein the encoded image is sent to the client according to a remote desktop protocol (RDP).

15. A system for variable compression of an image for remote display from a server to a client during a session across a communications network, comprising:
   a processor; and
   a memory communicatively coupled to the processor when the system is operational, the memory bearing processor-executable instructions that, when executed on the processor, cause the system to at least:
   determine a set of shared codecs;
   classify the image using a histogram of component frequencies of the image to produce a classification, the classification comprising text, text on a gradient background, a simple image segment, or a dense image segment;
   determine a codec of the shared codecs based on the classification;
   determine a fidelity based on the classification;
   in response to determining that encoding the image according to the codec and the fidelity fails, determine a second codec and a second fidelity based on the classification, and encode the image with the second codec and the second fidelity; and
   send the encoded image to the client across the communications network.

16. A computer-readable storage medium excluding signals comprising computer readable instructions that, when executed by a processor, cause the processor to perform operations comprising:
   determining a set of shared codecs;
   classifying an image using a histogram of component frequencies of the image to produce a classification, the classification comprising text, text on a gradient background, a simple image segment, or a dense image segment;
   determining a codec of the shared codecs based on the classification, and a hint, the hint comprising an application programming interface (API) call from an application that generated the image, a manifest for the application that generated the image, a policy, a schema, or an administrator policy;
   determining a fidelity based on the classification;
   encoding the image according to the codec and the fidelity; and
   sending the encoded image to the client across the communications network.

* * * * *